United States Patent [19]

Slutz

[11] Patent Number: 4,850,523

[45] Date of Patent: Jul. 25, 1989

[54] BONDING OF THERMALLY STABLE ABRASIVE COMPACTS TO CARBIDE SUPPORTS

[75] Inventor: David E. Slutz, Worthington, Ohio

[73] Assignee: General Electric Company, Worthington, Ohio

[21] Appl. No.: 158,336

[22] Filed: Feb. 22, 1988

[51] Int. Cl.$^4$ .............................................. B23K 31/04
[52] U.S. Cl. .................................. 228/121; 228/122; 228/222; 228/103; 228/263.12; 51/295
[58] Field of Search ............... 228/103, 121, 122, 124, 228/200, 222, 242, 263.12; 219/85 G; 51/295

[56] References Cited

U.S. PATENT DOCUMENTS

| | | |
|---|---|---|
| 3,677,060 | 7/1972 | Loqvist ................................ 228/122 |
| 3,894,673 | 7/1975 | Lowder et al. ...................... 228/122 |
| 3,940,050 | 2/1976 | Johnson et al. ..................... 228/122 |
| 4,018,576 | 4/1977 | Lowder et al. ...................... 51/309 |
| 4,194,673 | 3/1980 | Elbert et al. ........................ 228/222 |
| 4,225,322 | 9/1980 | Knemeyer ........................... 51/295 |
| 4,288,248 | 9/1981 | Bovenkerk et al. ................. 75/226 |
| 4,319,707 | 3/1982 | Knemeyer ........................... 228/121 |
| 4,414,178 | 11/1983 | Smith et al. ....................... 422/444 |
| 4,601,423 | 7/1986 | Pipkin et al. ....................... 228/121 |
| 4,661,180 | 4/1987 | Frushour ............................ 228/122 |

FOREIGN PATENT DOCUMENTS

| | | |
|---|---|---|
| 0185537 | 6/1986 | European Pat. Off. ............ 228/122 |
| 26574 | 2/1986 | Japan ................................ 228/122 |
| 961904 | 9/1982 | U.S.S.R. ........................... 228/222 |
| 2163144 | 2/1986 | United Kingdom . |

Primary Examiner—Nicholas P. Godici
Assistant Examiner—Samuel M. Heinrich
Attorney, Agent, or Firm—Mueller and Smith

[57] ABSTRACT

Disclosed is a method for bonding thermally-stable polycrystalline diamond or CBN compacts to carbide supports wherein the carbide support is placed in thermal contact with a heat sink and the thermally-stable compact is placed in thermal contact with a heat source during the brazing operation.

14 Claims, 2 Drawing Sheets

BONDING OF THERMALLY STABLE ABRASIVE COMPACTS TO CARBIDE SUPPORTS

BACKGROUND OF THE INVENTION

The present invention relates to polycrystalline masses of thermally-stable self-bonded diamond and CBN compacts and more particularly to the bonding ofo these thermally-stable compacts to carbide supports.

It is well known to use diamond, cubic boron nitride (CBN) or other abrasive particles embedded in the grinding, abrading, or cutting sectionn of various tools. Also well known in this art are compacts of polycrystalline abrasive particles typified by polycrystalline diamond and polycrystalline CBN compacts. Such compacts are represented by U.S. Pat. Nos. 3,745,623 and 3,609,818 with respect to polycrystalline diamond compacts; and U.S. Pat. Nos. 3,767,371 and 3,743,489 with respect to polycrystalline CBN compacts. While such polycrystalline compacts represent a significant contribution to this art in many fields of use, thermal degradation at elevated temperature, e.g. above about 700° C., did limit their usefulness, especially in metal matrix bond applications. The thermal stabilitty of such polycrystalline compacts was improved with the advent of porous (or thermally stable) self-bonded diamond and CBN compacts containing less than about three percent non-diamond phase, hereinafter often termed "porous compacts". Compacts of this type are the subject of U.S. Pat. Nos. 4,224,380 and 4,228,248.

Other thermally stable comptacts, though not "porous", include the compacts described in European Patent Publication No. 116,403, which compacts are described as comprising a mass of diamond particles present in an amount of 80 to 90% by volume of the body and a second phase present in an amount of 10 to 20% by volume of the body wherein, the mass of diamond particles containing substantial diamond-to-diamond bonding to form a coherent skeletal mass and a second phase containing nickel and silicon, the nickel being in the form of nickel and/oro nickel silicide and silicon being in the form of silicon, silicon carbide, and-/or nickel silicide. British patent application No. 8508295 descibes a compact comprising a mass ofo diamond particles present in an amount of 80 to 90% by volume in the compact andn a second phase present in an amount of 10 to 20% by volume of the insert, the mass of diamond particles containing substantial diamond-to-diamond bonding to form a coherent skeletal mass and a second phase consisting essentially of silicon, the silicon being in the form of silicon and/or silicon carbide. These products are described as being thermally stable as are the porous compacts described above. Additionally, cubic boron nitride compacts which are essentially 100% dense, i.e. substantially devoid in sintering aid or catalyst content, are described in U.S. Pat. Nos. 4,188,194 and 4,289,503. These CBN compacts are thermally stable due to the absence of catalyst content.

While conventional and thermally-stable compacts already are mated to a carbide support, the carbide support can be brazed to a carbide substrate in accordance with U.S. Pat. Nos. 4,225,322 and 4,319,707. Disclosed in these Knemeyer patents are a process and apparatus which permits the use of high temperature braze alloys for attaching a composite polycrystallinen compact t a carbide substrate. Such high temperature braze alloys, in turn, provide significantly greater bond strengths. The Knemeyer process and apparatus area based on the utilization of a heat sink in contact with the polycrystalline diamond or CBN layer of the supported compact being brazed to the carbide substrate. The heat sink insures that the temperture of the diamond/CBN compact will not exceed a temperature whereat thermal degradation of the compact can occur. This means that the two carbide pieces being brazed can be heated to a temperature sufficient for the braze alloy to reach its liquidus for forming a good braze joint. Upon cooling, the two carbide pieces contract abou the same so that little residual stress is placed on the braze joint since the two carbide pieces being joined have about the same coefficient of thermal expansion. Application of the heat sink apparatus in the brazing of conventional polycrystalline diamond/CBN compacts to carbide supports has been avoided since the residual metal sintering aid therein expresses a greater coefficient of thermal expansion than does the diamond/CBN, thus making the heating of the polycrystalline compacts to elevated temperature risky since, upon cooling, cracking of the compacts often is evident.

BROAD STATEMENT OF THE INVENTION

The present invention has adapted the basic philosophy expressed in the Knemeyer process, U.S. Pat. Nos. 4,225,322 and 4,319,707, in brazing thermally-stable compacts to carbide supports. However, since the thermally-stable compacts are substantially devoid of residual sintering aid/catalyst, they can be heated to substantially higher temperatures withou risk of cracking due to the presence of such metal when the heated compacts are cooled. Thus, the present invention fabricates a component comprised of a thermally-stable abrasive polycrystalline diamond or CBN compact which is bonded to a support, e.g. carbide support, utilizing a layer of brazing filler metal which is heated to a temperature of at least about the liquidus of the brazing filler metal for accomplishing the bonding of the support to the thermally-stable compact. This heating, however, is conducted by placing a heat sink in thermal contact with the carbide support being brazed and by placing a heat source in thermal contact with the thermally-stable compact being brazed to the carbide support. In this manner, the braze joint can be heated to a sufficiently high temperature in order that brazing filler metals having a liquidus substantially greater than 700° C. can be used without subjecting the carbide, metal, or other support to temperatures whereat loss of properties, e.g. by thermal degradation, is likely to occur. The thermally-stable compacts can withstand the higher temperatures and, in the particular case of diamond, the polycrystalline compact makes an excellent thermal path from the heat source to the brazing filler metal. Less stress is placed on the braze joint by the cooled carbide support because of the temperature modulation provided by the heat sink. For present purposoes, polycrystalline compacts are termed "thermallystable" by being able to withstand a temperature of 1200° C. in a vacuum without any significant structural degradation of the compact occurring.

Advantages of the present invention include the ability to effectively bond thermally-stable compacts to carbide supports. Another advantage is the ability to bond thermally-stable compacts configures in a variety of unique shapes, which heretofore were not amendable to brazing to carbide supports. These and other advantages will become readily apparent to those skilled in the art based upon the disclosure contained herein.

The drawings will be described in greater detail below.

DETAILED DESCRIPTION OF THE INVENTION

The component configuration utilized in the present invention takes advantage of the high thermal conductivity of the polycrystalline diamond and CBN to conduct the heat to the braze line. In doing so, the radial thermal gradient will be reduced creating a more uniform temperature at the brazing surface. In addition, the carbide support is being held at a cooler temperature than the diamond due to the heat sink. This reduces the residual stress left in the support from thermal expansion differences between the diamond and carbide. This means that a stronger braze joint will result.

Figure 1:
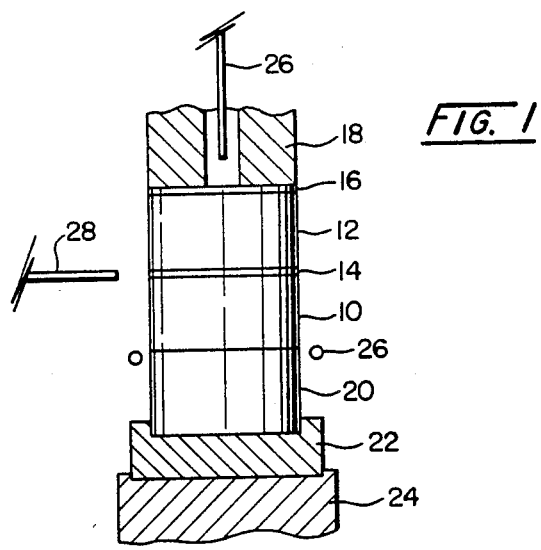
FIG. 1 is a plan view of the configuration of the working zone of the brazing apparatus showing the orientation of the pieces being brazed.

The details of construction and operation of the apparatus can be found in U.S. Pat. Nos. 4,225,322 and 4,527,978. Thus, a simplified plan view of the apparatus and configuration of the components being brazed is set forth at FIGS. 1 and 2. Referring to FIG. 1, thermally-stable polycrystalline diamond/CBN compact 10 is being bonded to support 12 via intermediate braze material 14. Support 12 most often will be carbide, though various metals, for example, could be used. Cooper or other conductive material slug 16 may be interposed between support 12 and heat sink 18 in order to enhance thermal contact therebetween. Carbide or other extension piece 20 is placed in conttact with thermally-stable compact 10 and thence into receptacle 22 which, in turn, is disposed within heat sink 24.

Indirect heating is accomplished via coil 26 which is disposed to provide thermal communication with thermally-stable polycrystalline compact 10. This arrangement permits the high thermal conductivity of thermally-stable polycrystalline compact 10 to be taken into account in heating braze material 14. While such heating occurs, heat sink 18 maintains carbide support 12 within a temperature range such that, upon cooling, residual stresses in carbide support 12 will be minimized.

It will be appreciated that determination of when the heating cycle should cease so that optimal brazing results can be difficult due to the confined nature of the components within the bonding apparatus. Accordingly, techniques were devised for monitoring the brazing process. One technique involves utilizing temperature probe 27 for monitoring the brazing temperature. Experimentation has given moderate correlation between the temperature measured by temperature probe 27 and the actual braze line temperature. However, the fluctuations from run to run can be inconsistent due to the presence of the heat sink and thermal coupling. Additionally, the correlation is valid only when the same size and grade of carbide support is being used.

Accordingly, temperature probe 28 can be plalced adjacent the braze line. Since the thermal gradient along the direction of heat flow is very large, probe 28 must be precisely placed adjacent the barze line the same distance in succeeding runs in order to establish cosistent tempeature profiles. Fortunately, when the braze melts, it forms a fillet on the carbide surface just above the braze line. Optical temperature measurement with an optical temperature probe of this fillet formation yields a disturbance in the temperature profile indicative of the fillet formation. Fillet formation, in turn, is due to the braze being heated to its liquidus and, accordingly, the end point of the heating cycle has been reached. Therefore, variations in heat sinking, thermal coupling, carbide support composition, or positioning or probe 28 will be eliminated since the actual braze formation can be determined electronically as opposed to utilizing a correlation technique.

Figure 2:
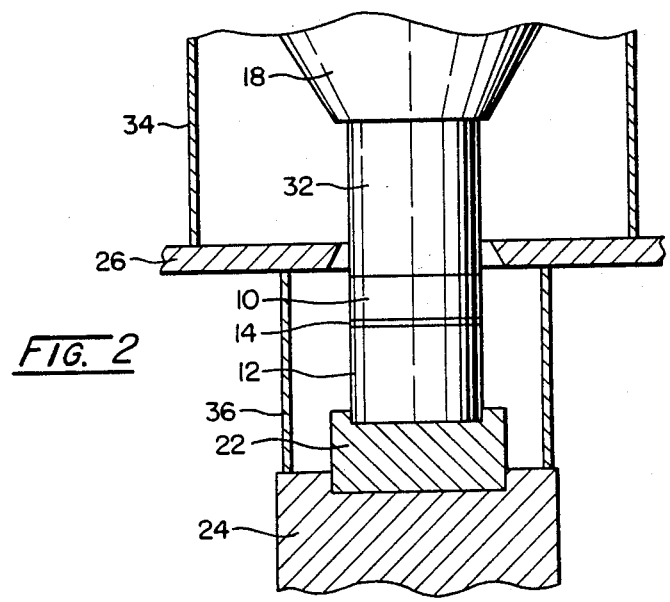
FIG. 2 is a plan view of an arrangement which is an alternative to that set forth at FIG. 1.

A revised and presently preferred configuration is set forth at FIG. 2. Referring to FIG. 2, porous compact 10 is being bonded to carbide support 12 via braze material 14. Carbide support 12 has been disposed below coil 26 and disposed in pot 22 which, in turn, is fitted in heat sink 24. Pot 22 may be made of thermal insulative material (e.g. lava) or can be made of thermally conductive material (e.g. brass) which presently is preferred. Carbide extension 32 in contact with thermally-stable compact 10 is extended in length compared to carbide extension 20 set forth at FIG. 1. Carbide extension 32 is in thermal contact with heat sink 18. Gas cover 34 and gas shield 36 complete the apparatus description.

The extension of carbide piece 32 serves two purposes. One purpose is to provide heat to the surface of thermally-stable compact 10. The other is to provide heat sinking to the diamon surface of thermally-stable compact 10. By heating through the diamond compact to the braze line, the excellent thermal propeties of diamond are utilized in reducing radial thermal gradients at the braze line as well as longitudinal thermal gradients in the diamond layer. Having carbide extension 32 attached to the heat sink gives better temperature control of the system. In addition, the hottest part of the apparatus will be heat sink carbide extension 32 and not the braze line. This configuration provides better control over the braze line temperature, i.e. utilizing a combination of heat generated from coil 26 and heat sinking provided by heat sink 18 via heat sinking extension 32.

In addition to the optial temperature sensors for determining the heating schedule as described at FIG. 1, an additional technique was devised in connection with the configuration set forth at FIG. 2. Braze material 14 often is provided in the form of a disk or foil which is interosed between thermally-stable compact 10 and carbide support 12. It was discovered that upon melting of braze material 14, the distance bettween compact 10 and support 12 diminishes accordingly. Thus, the stroke or displacement of compact 10 with respect to support 12 can be monitored. In fact, it was discovered that the compact/braze/support combination initially expands due to its being heated followed by a quick contraction upon the braze material reaching a temperature of at least its liquidus. At this point, the heating should be ceased in order to obtain optimal and reliably reproduceable brazing results.

Figure 3:
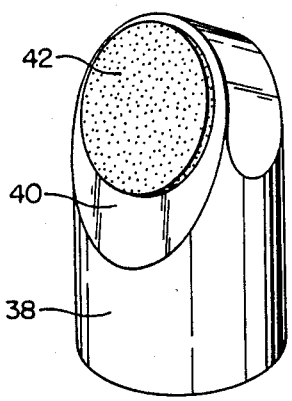
FIGS. 3-5 are perspective views of several unique product configurations which have been successfully fabricated in accordance with the precepts of the present invention.
Figure 4:
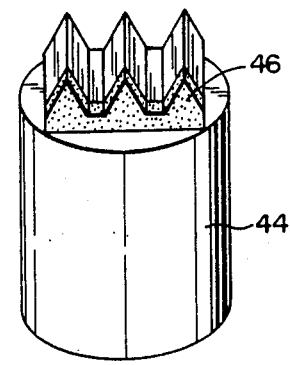
Figure 5:
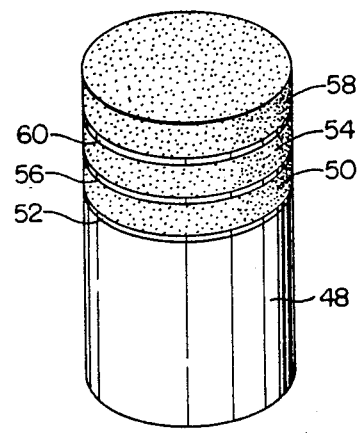

It will be appreciated that diamond is difficult to wet and, hence, brazing of diamond is a difficult task at best. Thus, the utilization of the technique disclosed herein for brazing porous compacts to carbide supports enables a variety of product configurations to be made. Three of these configurations are set forth at FIGS. 3–5. Referring to FIG. 3, carbide stud 38 has flat 40 disposed on its front surface. To flat 40 has been bonded porous compact 42. With respect to FIG. 4, carbide stud 44 has three parallel triangular ridges running about its upper surface. To the front of these three ridges has been brazed similarly configured porous compact 46. The uniqueness of the shape of this supported compact underscores the flexibility which the invention provides in brazing porous compacts to carbide supports. Referring to FIG. 5, it will be observed that cylindrical carbide piece 48 is bonded to porous compact 50 via braze material 52. Compact 50, in turn, is brazed to porous compact 54 via braze material 56. Porous compact 54, in turn, is brazed to porous compact 58 via braze 60. Again, the ability to multiply bond carbide and porous compacts is exhibited. If deseired, a carbide support can be bonded to the upper exposed surface of porous compact 58 to make a sandwich configuration. Finally, it will be appreciated that the inventive apparatus could be used in the formation of a sandwich configuration wherein a thermally stable compact, e.g. porous compact, is interposed between two pieces of carbide, for example all three pieces being cylindrical in configuration. With sufficient heat sinking of the two carbide supports, the high residual stresses imposed on the thermally stable core compact should be largely overcome for making the sandwich configuration. A sandwich configuration would be useful for twist drill applications, for example.

With respect to the braze filler alloys, such alloys desirably will have a liquidus of greater than 700° C. in order to take advantage ofo the design of the bonding apparatus disclosed herein. Braze alloy compositions for thermally-stable compacts have been disclosed in British Pat. No. 2,163,144 to be comprised of gold or silver containing between about 1 and 10 percent by weight of an active metal selected from the group fo titanium, zirconium, hafnium, vanadium, niobium, tantalum, chromium, and molybdenum. While such alloy composition can be used, the prferred alloy is an alloy containing an effective amount of chromium, such as disclosed in co-pending application Ser. No. 07/158,575, filed on even date herewith. While some carbide-forming materials may provide a degree of brazing, this co-pending application reports the unexpectedly superior results which chromium-containing alloys provide in bonding thermally-stable compacts to carbide supports and, thus, are preferred for use in practice of the present invention.

The support to which the polycrystalline thermally-stable compact is brazed preferably is comprised of material selected from the group consisting of tungsten carbide, titanium carbide, tungsten-molybdenum carbide, tantalum carbide or the like, wherein the metal bond material for the carbide includes cobalt, nickel, iron, and the like and mixtures thereof, an elemental metal which forms a stable nitride or boride, and a metal alloy which forms a stable nitride or boride. A wide variety of cemented carbide supports are well known in this art. As noted above, metal supports may be used also.

The following example shows how the present invention has been practiced, but should not be construed as limiting. In this application, all citations referred to herein are expressly incorporated herein by reference.

EXAMPLE

The duration of heating during the brazing operation best is controlled by monitoring the longitudinal displacement or stroke of the compact/braze/support configuration. In this example, the displacement past maximum and pasat minimum was varied and the resulting shear strength of the brazed implement measured. The braze alloy utilized was the A-85 alloy set forth in co-pending application Ser. No. 07/158,578 (cited above) and comprised by weight percent: nickel 55.9%, chromium 10.5%, boron, 2.5%, palladium 30.5%, manganese 0.1%, and iron 0.5%. The porous polycrystalline diamond compacts (0.525 inch in diameter and 0.060 inch thick) were brazed to carbide supports (Carboloy grade 55B carbide; 84% WC, 16%C; 0.529 inch by 0.300 inch thick; General Electric Company, Detroit, Mich., Carboloy being their registered trademark).

TABLE 1

| Sample No. | End Point[1] $d_1$ | Shear Strength[2] (kpsi) |
|---|---|---|
| 278 | 0 | 20.4 |
| 280 | 0 | 41.7 |
| 289 | 0.00005 | 13.9 |
| 276 | 0.0001 | 78.5 |
| 277 | 0.0001 | 66.8 |
| 279 | 0.0001 | 78.1 |
| 281 | 0.0002 | 73.8 |
| 283 | 0.0002 | 73.3 |
| 284 | 0.0003 | >86.8 |
| 291 | 0.0003 | 83.8 |
| 285 | 0.00035 | >86.8 |
| 282 | 0.0004 | >86.8 |
| 297 | 0.0004 | 86.4 |
| 288 | 0.0005 | >86.8 |
| 286 | 0.00055 | >86.8 |
| 292 | 0.00065 | >86.8 |
| 295 | 0.00065 | >86.8 |
| 290 | 0.00075 | >86.8 |
| 296 | 0.00080 | >86.8 |
| 293 | 0.00085 | >86.8 |
| 294 | 0.00095 | >86.8 |

[1] distance past maximum displacement
[2] 86.8 indicates limit of testing machine

TABLE 2

| Sample No. | End Point[3] $d_2$ | Shear Strength[2] (kpsi) |
|---|---|---|
| 217 | 0.0001 | 60.3 |
| 218 | 0.0001 | 58.6 |
| 219 | 0.0001 | 81.1 |
| 220 | 0.0001 | >86.8 |
| 221 | 0.0002 | 71.6 |
| 222 | 0.0002 | 76.4 |
| 223 | 0.0002 | 76.8 |
| 224 | 0.0002 | 74.2 |
| 225 | 0.0003 | 77.3 |
| 226 | 0.0003 | 84.6 |
| 227 | 0.0003 | 56.8 |
| 228 | 0.0003 | 77.7 |
| 229 | 0.0004 | 73.8 |
| 230 | 0.0004 | 13.0 |
| 231 | 0.0004 | 78.5 |
| 232 | 0.0004 | 69.4 |
| 233 | 0.0005 | 0 |
| 234 | 0.0005 | 0 |
| 235 | 0.0005 | 84.1 |
| 236 | 0.0005 | 37.7 |
| 237 | 0.0006 | 0 |
| 238 | 0.0006 | 0 |

TABLE 2-continued

| Sample No. | End Point[3] $d_2$ | Shear Strength[2] (kpsi) |
|---|---|---|
| 239 | 0.0006 | 43.8 |

[3] distance past minimum displacement

The foregoing data establishes the efficacies of the apparatus and method disclosed herein for brazing porous compacts. This example also demonstrates the sensitivity for conducting the brazing process only for a time period sufficient for the braze alloy to melt and flow between the surfaces being bonded together. If the duration of heating is insufficient or too long, however, optimal bond strengths are not achieved even to the point of delamination. As noted above, optical sensors can be used to follow the progress of heating, though the displacement technique described above presently is preferred.

I claim:

1. In a method for fabricating a brazed implement comprising a thermally-stable polycrystalline compact bonded to a cemented carbide support by a brazing filler alloy having a liquidus above about 700° C., the improvement which comprises placing a heat sink in thermal contact with said support being brazed, placing one surface of a thermally-conductive extension in contact with a surface of said thermally-stable compact disposed opposite said surface of said compact adjacent said brazing alloy, a surface of said extension opposite said porous compact being in thermal contact with a heat sink during the brazing operation, and placing a heat source in thermal contact with a surface of said extension opposite the thermally-stable compact during the brazing operation.

2. The method of claim 1 wherein said extension comprises a cemented carbide material.

3. The method of claim 1 wherein said compact comprises a sintered polycrystaline cubic boron nitride compact made by a high temperature/high pressure process from preferentially oriented pyrolytic hexagonal boron nitride which is substantially free of catalytically-active materials.

4. The method of claim 1 wherein said thermally-stable compact comprises a compact of self-bonded diamond or cubic boron nitride particles having a network of interconnected empty pores dispersed throughout the compact.

5. The method of claim 4 wherein said compact comprises a selfbonded diamond particles.

6. In a method for fabricating a brazed implement comprising a compact of self-bonded diamond or cubic boron nitride particles having a network of interconnected empty pores dispersed throughout the compact bonded to a cemented carbide support by a brazing filler alloy having a liquidus above about 700° C., the improvement which comprises placing a heat sink in thermal contact with said carbide support being brazed, placing one surface of a thermally-conductive extension in contact with a surface of said porous compact disposed opposite said surface of said compact adjacent said brazing alloy, a surface of said extension opposite said porous compact being in thermal contact with a heat sink during the brazing operation, and placing a heat source in thermal contact with a surface of said extension opposite the porous compact during the brazing operation.

7. The mthod of claim 6 wherein a high thermally conductive material is interposed between said carbide support and said heat sink to establish a high thermally conductive path therebetween.

8. The method of claim 6 wherein said extension comprises a cemented carbide material.

9. The method of claim 8 wherein said porous compact is selected from the group consisting of a porous polycrystalline diamond compact and a porous polycrystalline cubic boron nitride compact.

10. The method fo claim 6 wherein a plurality of said porous compacts having a brazing alloy disposed therebetween are brazed during said process, one of said compacts being brazed to said carbide support.

11. The method of claim 6 wherein the displacement ofo the compact/braze alloy/support combination is monitored for determining the duration of heating during the brazing operation.

12. The method of claim 6 wherein the formation of a fillet of said brazing alloy is monitored for determining the duration of heating during the brazing operation.

13. The method of claim 9 wherein said compact being brazed comprises said polycrystalline diamond compact.

14. The method of claim 9 wherein the compact being brazed comprises said polycrystalline boron nitride compact.

* * * * *